US008925691B2

(12) United States Patent
Gruber et al.

(10) Patent No.: US 8,925,691 B2
(45) Date of Patent: Jan. 6, 2015

(54) BELLOWS DISPOSED ON A GUIDE MEMBER OF A DISC BRAKE

(75) Inventors: Markus Gruber, Ebersberg (DE); Igor Nesmjanowitsch, Hengersberg (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 93 days.

(21) Appl. No.: 13/012,191

(22) Filed: Jan. 24, 2011

(65) Prior Publication Data
US 2011/0186389 A1    Aug. 4, 2011

Related U.S. Application Data

(63) Continuation of application No. PCT/EP2009/005355, filed on Jul. 23, 2009.

(30) Foreign Application Priority Data

Jul. 25, 2008  (DE) .................. 10 2008 034 652

(51) Int. Cl.
*F16D 65/14*    (2006.01)
*F16D 55/2265*  (2006.01)
*F16J 3/04*     (2006.01)

(52) U.S. Cl.
CPC ............. *F16D 55/2265* (2013.01); *F16J 3/043* (2013.01); *F16J 3/046* (2013.01); *F16J 3/048* (2013.01)
USPC ................ 188/73.45; 188/73.44; 188/71.1; 188/73.1

(58) Field of Classification Search
CPC ........ F16D 55/2265; F16J 3/042; F16J 3/046; F16J 3/048; F16J 3/043
See application file for complete search history.

(56) References Cited

U.S. PATENT DOCUMENTS

| 4,084,666 | A | * | 4/1978 | Karasudani ................. 188/73.45 |
| 4,235,313 | A | | 11/1980 | Hirashita |
| 4,447,066 | A | * | 5/1984 | Katagiri et al. ............... 277/636 |
| 4,530,506 | A | | 7/1985 | Weiler et al. |
| 4,832,161 | A | * | 5/1989 | Weiler et al. ............... 188/73.44 |
| 5,161,651 | A | * | 11/1992 | Weiler et al. ............... 188/73.44 |
| 5,183,136 | A | * | 2/1993 | Maeda et al. .............. 188/73.44 |
| 5,261,678 | A | * | 11/1993 | Takemori et al. ............ 277/630 |
| 5,299,665 | A | * | 4/1994 | Weiler et al. ............... 188/73.44 |
| 5,308,284 | A | * | 5/1994 | Renzo et al. .................. 464/175 |
| 5,499,701 | A | * | 3/1996 | Harinaga ..................... 188/72.4 |
| 5,765,837 | A | * | 6/1998 | Schwarzler ................... 277/636 |
| 6,039,156 | A | * | 3/2000 | Schneider ................ 188/73.44 |

(Continued)

FOREIGN PATENT DOCUMENTS

| DE | 70 47 641 U | 5/1972 |
| DE | 86 32 511 U1 | 5/1987 |

(Continued)

OTHER PUBLICATIONS

International Search Report dated Sep. 22, 2009 with English translation (four (4) pages).
German Office Action dated Jun. 3, 2009 with English translation (six (6) pages).

*Primary Examiner* — Thomas Irvin
(74) *Attorney, Agent, or Firm* — Crowell & Moring LLP

(57) ABSTRACT

A bellows situated on a guide member of a disc brake, in particular of a commercial vehicle, has one end with a continuous sealing lip, which in a functional position sealingly abuts the guide member. The bellows is designed such that the sealing lip is rigidly connected to the adjacent series of folds.

14 Claims, 2 Drawing Sheets

(56) References Cited

U.S. PATENT DOCUMENTS

| | | | |
|---|---|---|---|
| 6,179,717 B1 | 1/2001 | Schwarzler | |
| 6,609,593 B2 * | 8/2003 | Ishii et al. | 188/73.44 |
| 7,097,004 B2 * | 8/2006 | Barrett et al. | 188/72.4 |
| 7,284,642 B2 | 10/2007 | Macke et al. | |
| 7,354,349 B2 * | 4/2008 | Wette | 464/173 |
| 2002/0050428 A1 | 5/2002 | Ishii et al. | |

FOREIGN PATENT DOCUMENTS

| | | | |
|---|---|---|---|
| DE | 103 41 095 A1 | 4/2005 | |
| DE | 10 2004 003 083 A1 | 8/2005 | |
| FR | 2 771 148 A1 | 5/1999 | |
| GB | 2 134 994 A | 8/1984 | |
| GB | 2296946 A * | 7/1996 | F16D 3/84 |
| JP | 55-76227 A | 6/1980 | |

* cited by examiner

BELLOWS DISPOSED ON A GUIDE MEMBER OF A DISC BRAKE

CROSS-REFERENCE TO RELATED APPLICATIONS

This application is a continuation of PCT International Application No. PCT/EP2009/005355, filed Jul. 23, 2009, which claims priority under 35 U.S.C. §119 from German Patent Application No. DE 10 2008 034 652.7, filed Jul. 25, 2008, the entire disclosures of which are herein expressly incorporated by reference.

BACKGROUND AND SUMMARY OF THE INVENTION

The invention relates to a bellows disposed on a guide member of a disc brake.

Bellows are provided to protect the guide members on which, for example, the brake caliper of a sliding-caliper disc brake is mounted displaceably, which bellows are fastened at their ends respectively to the guide member and to the component which is movable relative thereto, for example the brake caliper.

Dirt is thereby prevented from entering the slide region and thus degrading or destroying the sliding properties thereof. The same applies to moisture which might otherwise penetrate and lead to corrosion damage.

The bellows is retained at one end in a form-fitting manner on the guide member, for which purpose it has at the associated end a sealing ring which engages in a circumferential groove of the guide member and is secured in this position.

At the other end, the bellows is retained in the brake caliper and sealed with respect to the guide member by a sealing lip, which bears circumferentially against the guide member. The abutment of the bellows against the guide member at both ends produces a practically airtight closure which, however, gives rise to considerable disadvantages.

As the brake caliper is displaced relative to the guide member, the volume of the region enclosed by the bellows changes. However, the air cannot escape to the outside and inflates the bellows, the sealing lip being pressed against the guide member by the overpressure produced, resulting in an especially firm, airtight abutment of the sealing lip against the guide member.

Especially during changing of a brake pad, when the brake caliper is displaced along the guide member in a very short time, damage to the bellows can occur, above all when a new replacement brake pad is installed.

In this case replacement of the bellows is urgently necessary, since otherwise its protective function is not ensured.

Furthermore, purely functional problems are created by the airtight connection. An inflated bellows acts as an air spring which presses the brake pad against the brake disc of the disc brake, so that the brake pad rests constantly against the brake disc while the vehicle is moving, which can cause hot-running of the brake with the resulting problems, especially with regard to safety.

It is the object of the invention to develop a bellows such that the overall functional and operating safety of the disc brake is improved.

This and other objects are achieved by a bellows disposed on a guide member of a disc brake, in particular of a commercial vehicle, which bellows has arranged at one end a circumferential sealing lip, which bears sealingly against the guide member in a functional position. The sealing lip is connected rigidly to the adjacent corrugation.

This configuration of the bellows ensures that when it is compressed an air pressure equalization takes place, since, on account of the inflation of the whole bellows through overpressure, the rigid connection of the sealing lip to the adjacent corrugation causes the sealing lip to be lifted from the guide member, so that the, so to speak, excess air quantity can escape without difficulty.

In the case, above all, of the rapid compression of the bellows described in relation to the prior art, which occurs typically when exchanging brake pads, a pressure equalization between the interior chamber enclosed by the bellows and the environment now takes place immediately.

As this happens the sealing lip acts like a nonreturn valve, since the sealing lip, on account of the restoring forces, again rests sealingly against the guide member over its full circumference after a pressure equalization has taken place.

According to an advantageous development of the invention, the rigid connection of the sealing lip to the adjacent corrugation can be produced by integrally molded webs which bridge the gap present between the sealing lip and the adjacent corrugation.

In the case of a two-part configuration of the sealing lip and the bellows, separate webs, which are connected form-fittingly both to the bellows and to the sealing lip, may be provided. It is also possible to mold the webs integrally on the sealing lip or the bellows, each being seen as a separate part, and to connect the webs form-fittingly to the respective other part.

The number and dimensioning of the webs may vary and are essentially dependent on the object concerned.

The brake pad wear described in relation to the prior art is now effectively prevented, as is the inflation of the bellows while exchanging brake pads, whereby the danger of damage to the bellows is practically eliminated.

Since, moreover, the bellows is only compressed but is not extended in operation, and therefore only the production of increased internal pressure must be prevented by the invention, measures which would necessitate a pressure equalization upon extension of the bellows do not need to be provided, so that the invention can be implemented with extremely simple means.

Self-evidently, this implies that cost and complexity can be kept very low and that manufacture and assembly can therefore be extremely cost-effective, so that the invention can be implemented basically in a cost-neutral manner.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
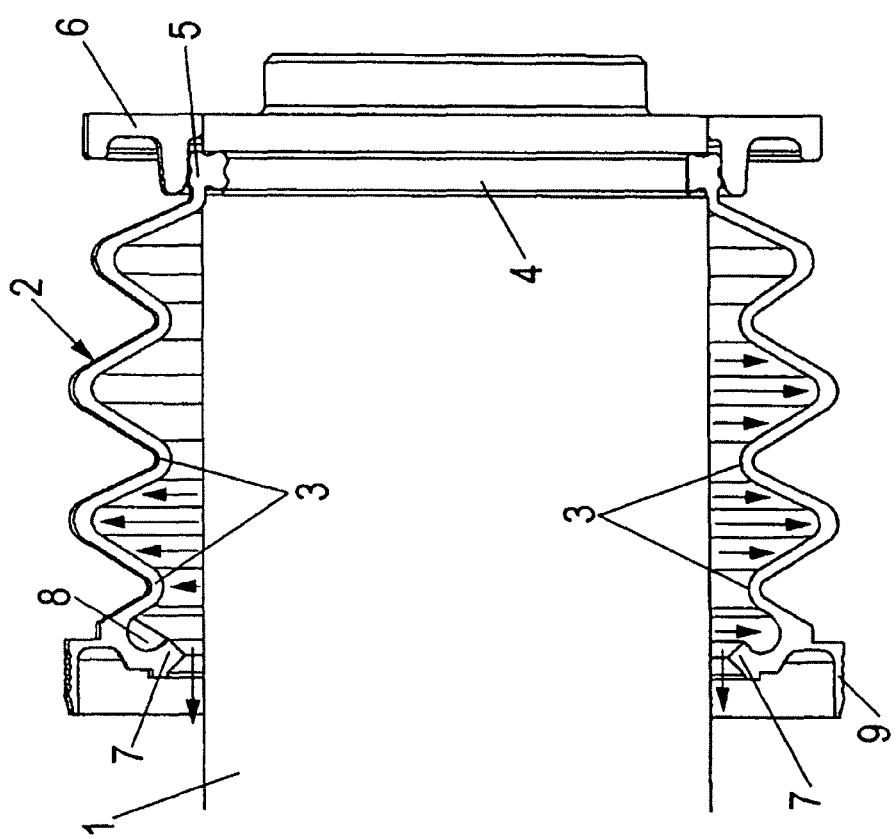
FIG. 1 is a longitudinal section view of a bellows according to an embodiment of the invention in a partially assembled position.

FIG. 1 shows a bellows 2 fastened to a guide member 1 of a disc brake, in particular of a commercial vehicle disc brake, which bellows 2 exhibits a plurality of corrugations (i.e., folds) 3 and is provided at one end with a sealing ring 5, which engages by way of a retaining ring 6 in a circumferential groove 4 of the guide member 1.

Located on an end of the bellows 2 oriented towards a brake caliper (not shown) is a sealing lip 7, which in its functional position bears circumferentially in a sealing manner against the guide member 1. In this case the bellows 2 is connected to the brake caliper by a fastening collar 9.

Figure 2:
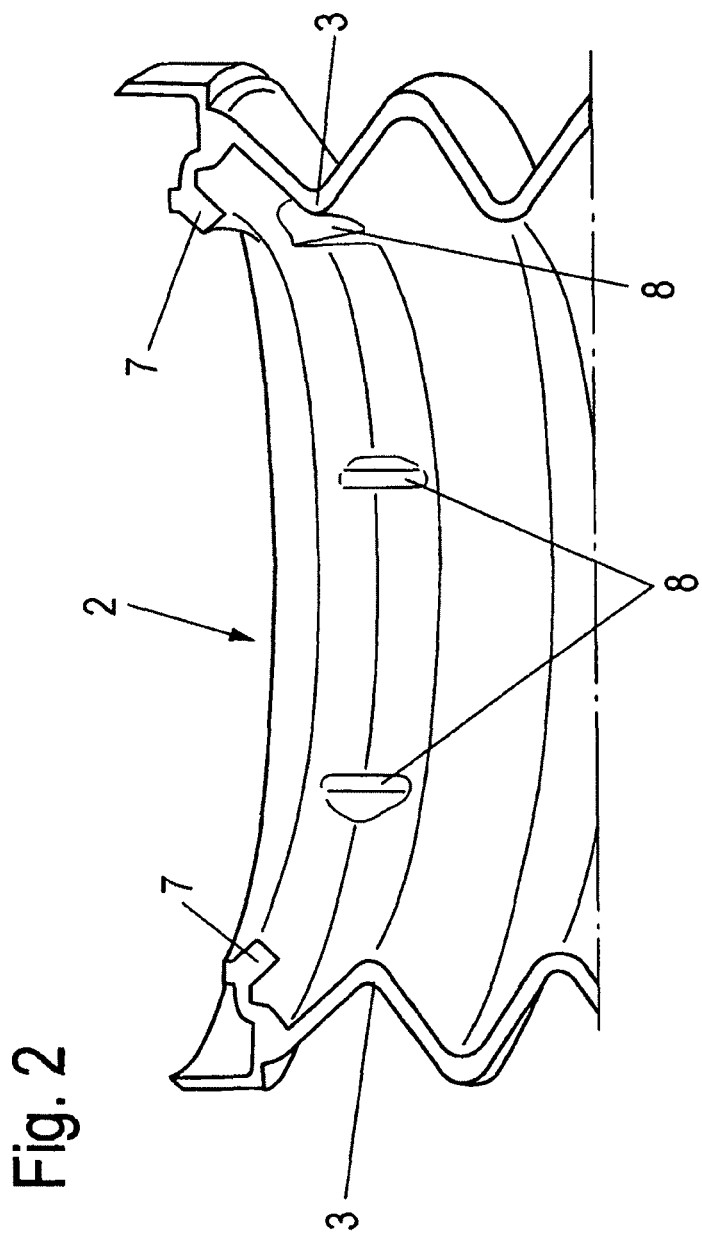
FIG. 2 shows a detail of the bellows of FIG. 1 in a sectional perspective view.

As can be seen in particular in FIG. 2, the sealing lip 7 is connected rigidly to the adjacent corrugation 3, for which purpose there are provided webs 8 which extend in relation to the longitudinal axis of the bellows 2 and are fastened on one side to the sealing lip 7 and on the other to the corrugation 3. The webs 8 are preferably distributed uniformly, that is, with an equal angular distance from one another, over the circumference of the bellows.

In the course of a reduction in volume of the interior through compression of the bellows 2, the prevailing internal pressure increases, inflating the corrugations 3 radially. This is indicated in FIG. 1 by the radially-extending arrows.

This movement of the corrugations 3 lifts the sealing lip 7 from the guide member 1 via the rigid connection, so that, as indicated by the axial arrows, the internal pressure is compensated by the escape of the air.

FIG. 1 therefore shows a state in which the bellows 2 is partially compressed and the sealing lip 7 is raised off the guide member 1, allowing air to pass through.

In FIG. 2, this position is illustrated on the right-hand side, while the left-hand side reproduces a functional position in which the sealing lip 7 bears sealingly against the guide member 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A bellows for use on a guide member of a disc brake, the bellows comprising:
   a plurality of corrugations of the bellows;
   a circumferential sealing ring at one axial end of the bellows, the circumferential sealing ring being operatively configured to bear sealingly against a surface of an annular groove of the guide member that is located at least one of in and immediately adjacent to, and radially below, a guide surface of the guide member when the sealing ring is in a functional position around the guide member, wherein the guide surface of the guide member is a bearing surface supporting sliding guidance of one component of the disc brake relative to another component of the disc brake;
   a circumferential sealing lip at an opposite axial end of the bellows operatively configured to bear sealingly against the guide surface of the guide member in a manner that allows axial displacement of the guide surface and the sealing lip relative to one another when the guide member and the bellows are installed in the disc brake; and
   one or more webs located on a radially inner surface of the bellows and being operatively configured to rigidly connect the sealing lip to an adjacent one of the plurality of corrugations such that upon compression of the bellows after the bellows is in an installed position on the guide member, an air gap is formed at the circumferential sealing lip of the bellows.

2. The bellows according to claim 1, wherein the one or more webs are distributed uniformly around an inner circumference of the bellows.

3. The bellows according to claim 2, wherein the uniform distribution is at equal angular intervals from one another.

4. The bellows according to claim 2, wherein the one or more webs are molded integrally on at least one of the adjacent corrugation and the sealing lip.

5. The bellows according to claim 2, wherein the one or more webs are molded integrally on at least one of the adjacent corrugation and the sealing lip.

6. The bellows according to claim 2, wherein the one or more webs are connected form-fittingly to at least one of the sealing lip and the adjacent corrugation.

7. The bellows according to claim 2, wherein the one or more webs are connected form-fittingly to at least one of the sealing lip and the adjacent corrugation.

8. A disc brake for a commercial vehicle, comprising:
   a sliding caliper;
   a guide member on which the sliding caliper is operatively disposed to slide; and
   a bellows having a plurality of corrugations, the bellows radially enclosing the guide member,
   wherein
      one end of the bellows has a circumferential sealing ring that bears sealingly against a surface of an annular groove of the guide member that is located at least one of in and immediately adjacent to, and radially below, a guide surface of the guide member when the sealing ring is in a functional position around the guide member,
      an opposite end of the bellows has a circumferential sealing lip that bears against the guide surface of the guide member in a manner that allows axial displacement of the guide surface and the sealing lip relative to one another when the guide member and the bellows are installed in the disc brake, and
      one or more webs rigidly connected the sealing lip to an adjacent one of the plurality of corrugations are located on a radially inner surface of the bellows such that upon compression of the bellows after the bellows is in an installed position on the guide member an air gap is formed at the circumferential sealing lip end of the bellows.

9. The disc brake according to claim 8, wherein the one or more webs are distributed uniformly around an inner circumference of the bellows.

10. The disc brake according to claim 9, wherein the uniform distribution is at equal angular intervals from one another.

11. The disc brake according to claim 9, wherein the one or more webs are molded integrally on at least one of the adjacent corrugation and the sealing lip.

12. The disc brake according to claim 9, wherein the one or more webs are connected form-fittingly to at least one of the sealing lip and the adjacent corrugation.

13. The disc brake according to claim 8, wherein the one or more webs are molded integrally on at least one of the adjacent corrugation and the sealing lip.

14. The disc brake according to claim 8, wherein the one or more webs are connected form-fittingly to at least one of the sealing lip and the adjacent corrugation.

* * * * *